United States Patent [19]

Keller et al.

[11] Patent Number: 4,948,612

[45] Date of Patent: Aug. 14, 1990

[54] CONTINUOUS PRODUCTION OF COOKIE-LIKE PRODUCT

[75] Inventors: Lewis C. Keller, North Richland Hills; Richard B Reed, Lewisville, both of Tex.

[73] Assignee: Frito-Lay, Inc., Dallas, Tex.

[21] Appl. No.: 321,272

[22] Filed: Mar. 9, 1989

[51] Int. Cl.$^5$ .......................... A21D 8/00; A23P 1/00
[52] U.S. Cl. ...................................... 426/549; 426/516
[58] Field of Search .............................. 426/549, 516

[56] References Cited

U.S. PATENT DOCUMENTS 4,892,471  1/1990  Baker ................................ 425/132

FOREIGN PATENT DOCUMENTS 2131670  6/1984  United Kingdom .
2136666  9/1984  United Kingdom .

*Primary Examiner*—Donald E. Czaja
*Assistant Examiner*—Mary S. Mims
*Attorney, Agent, or Firm*—Bernard, Rothwell & Brown

[57] ABSTRACT

A crystallizable sugar is plasticized and then blended with shortening and flour to form an extrudable blend containing 15% by weight moisture or less, which then is extruded. The extruded blend requires little or no additional heat treatment or drying to form a food product having cookie-like characteristics.

17 Claims, 1 Drawing Sheet

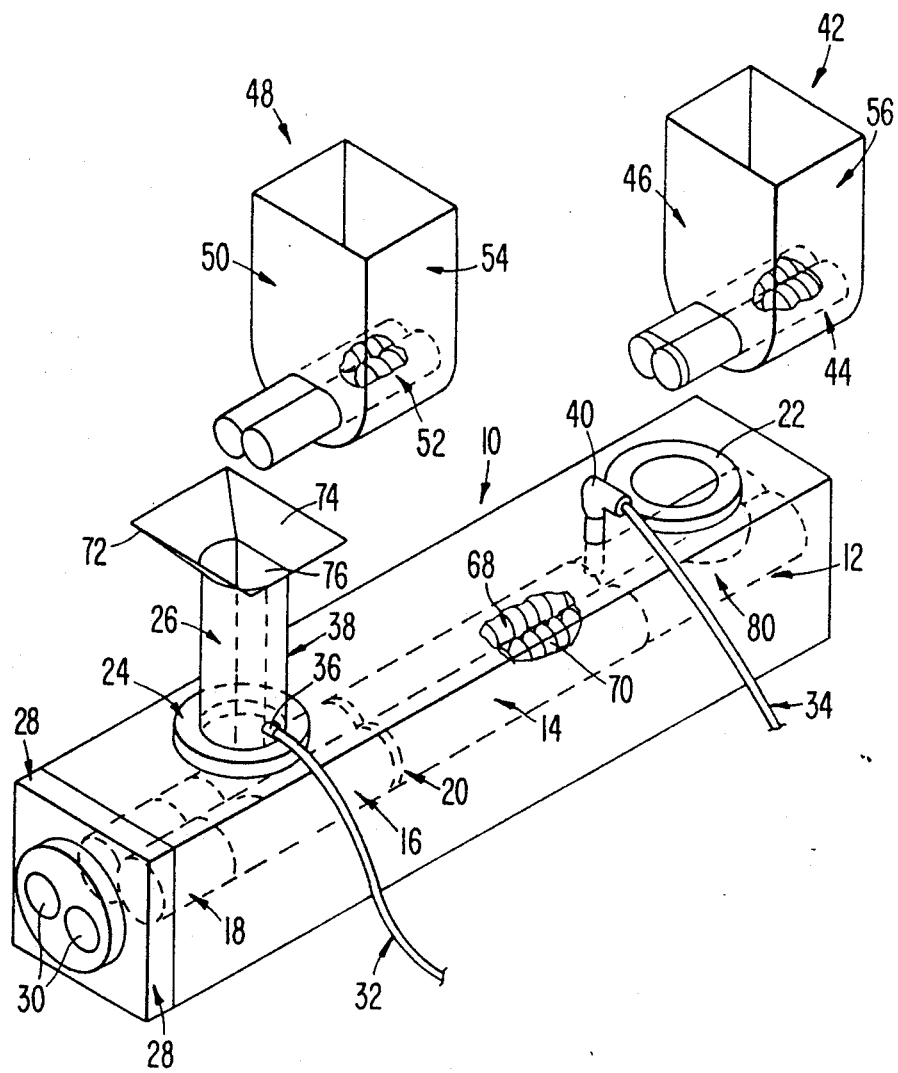

CONTINUOUS PRODUCTION OF COOKIE-LIKE PRODUCT

BACKGROUND OF THE INVENTION

Field of the Invention

This invention relates to an improved process for the production of a cookie-like product.

Background Art

The preparation of baked cookies is an art that has been practiced for many years. Cookies are small sweet dough products that generally are made from flour, water, shortening and sugar. In addition to these ingredients, optional flavoring materials often are added. At its simplest, the preparation of cookies involves the following steps: mixing of the ingredients to form a dough; forming the mixed dough into preforms; and baking the preforms. During and after baking, the baked product undergoes equilibration, which is characterized by the migration and evaporation of moisture from and within the cookie matrix and by crystallization of sugar within the matrix. Therefore, sugar not only provides sweetness to cookies but also contributes to the structural and textural properties of cookies. What distinguishes cookies texturally from other forms of baked dough products is that cookies have a distinctly friable, short, crumb texture.

With previous types of mass-produced cookies, the ingredients generally have been mixed by batch processes that are labor intensive and can result in batch-to-batch variation in uniformity. Also, these processes require a relatively large amount of capital equipment, energy, and space, especially for baking the cookie dough into a finished product. For example, in a conventional rotary mold method for producing cookies, a dough is prepared typically in a batch mixing operation by combining water with flour, powdered sugar, shortening, salt, soda, and other flavors, colors, leavenings, etc. as may be desired.

After mixing, the dough is introduced into the molds of a rotary molder, a cylinder having multiple molds engraved upon its surface. The pieces of molded dough are removed from the molds and placed on a baking conveyor which proceeds through a high capacity continuous baking oven. Typical ovens used with rotary molding machines are up to 300 feet in length or more, see, e.g., "Biscuit and Cracker Handbook", 1981, The Biscuit Bakers Institute, 1660 L Street N.W., Washington., DC 20036.

After baking, the cookies are cooled prior to packaging. In some cases, a cream is deposited upon one cookie and another cookie is deposited on top of the cream to create a sandwich cookie.

The conventional method as outlined above utilizes large amounts of space inside a factory. Moreover, it is difficult to reduce the amount of space required since the continuous baking is carried out in a straight line from the molder to at least the end of the oven, which can be several hundred feet in length. The cost of the large amount of space required by the manufacturing facility adds to the cost of cookie production. Therefore, a process that could produce cookies continuously and in a small amount of space would be a significant advancement in cookie production technology.

Methods for continuously producing biscuits using cooking extruders are known. Cooking extruders continuously cook the dough therein, and extrude it at high temperatures. For example, U.K. Patent Application No. 2,136,666 discloses a method for producing a biscuit wherein a mixture containing 43% to 93% amylaceous powder, 0% to 30% sugar and 2% to 12% edible oil and/or fat is cooked in a cooking extruder. U.K. Patent Application G.B. 2,131,670 discloses a method of preparing a food product by mixing starch, starch-derived or starch-based material with at least its own weight of at least one sugar or sugar derivative. This method includes one step in which the mixture is subjected to cooking extrusion. The use of cooking-type extruders in the production of cookies produces a product that is generally considered to have undesirable flavor, textural and structural characteristics. This is because prior art cooking extrusion processes gelatinize the starch in the dough and therefore produce products with hard, crispy, cellular textures. As a result, the products produced by conventional extrusion methods do not have the friable, short, crumb texture typical of cookies.

There thus exists a need in the art for an extrusion process that produces a cookie-like product having desirable cookie flavor and texture characteristics.

SUMMARY OF THE INVENTION

In accordance with the present invention, a method of forming a food product having cookie-like characteristics comprises plasticizing a crystallizable sugar, blending the plasticized crystallizable sugar with shortening and flour to form an extrudable blend containing about 15% moisture by weight or less, and extruding the blend. The extruded blend requires little or no additional heat treatment or drying to form a food product having cookie-like characteristics.

DETAILED DESCRIPTION OF THE INVENTION

The present invention relates to a method of producing a food product having cookie-like characteristics as discussed herein above. The invention comprises extruding a blend of plasticized crystallizable sugar, shortening and flour, which blend has a very low moisture content that requires little or no heating or drying, after forming, to yield the desired product.

One ingredient for use in the method of the present invention is a crystallizable sugar. Sucrose is the most commonly available readily crystallizable sugar, and is a preferred crystallizable sugar according to the present invention. Other sugars, such as dextrose, fructose, maltose, lactose and the like as well as mixtures thereof can be readily incorporated at varying levels, depending on the texture desired in the finished product. Sugars such as dextrose and fructose, which are commonly present in syrups, crystallize slowly when in solution or when present in components of a mixture, with the degree of crystallization depending on moisture content, temperature, length of time, and presence of other materials which might affect crystallization. A number of nutritive sweeteners of varying degrees of crystallizability that are useful in cookie manufacture, such as sucrose, invert syrup, brown sugar, molasses, corn syrup of varying degrees of conversion, corn syrup solids, dextrose, high fructose syrups, honey, maple syrup and lactose, are listed in Matz, *Cookie and Cracker Technology*, second ed., Avi Publishing Co. (1978).

In accordance with this invention, the crystallizable sugar is disposed in a flowable state as discussed herein below (sometimes referred to as being "plasticized")

prior to being mixed with the other ingredients of the product. In its plasticized state the crystallizable sugar is blended with the other ingredients of the present invention and extruded to impart cookie-like texture and flavor characteristics to the extrudate. The crystallizable sugar can be worked into a plasticized state by being subjected to shear, heat and pressure forces. The shear, heat and pressure conditions suitable for plasticizing the crystallizable sugar can be developed in a screw extruder, which permits production on a continuous basis.

According to one embodiment, the crystallizable sugar is disposed in an aqueous solution containing 20% by weight or less water, preferably less than 10% by weight water. In a preferred embodiment, the crystallizable sugar is sucrose, which is present in a predominantly sucrose-containing material, such as a saturated or super-saturated aqueous solution.

After the sucrose-containing material is plasticized, it is mixed with the other ingredients to form an extrudable final blend. One component of the other ingredients of the extrudable final blend is shortening. The shortening employed can be any of the shortenings conventionally employed in the production of cookies, such as fats or oils. The shortening can be, for example, an unsaturated, partially hydrogenated or completely hydrogenated oil such as safflower, sunflower, cottonseed, soybean, corn, coconut, peanut or rapeseed oil. If the shortening is a solid at room temperature, it advantageously is heated to a temperature above its melting point prior to blending with the other ingredients.

Another ingredient of the extrudable final blend is flour. The flour can be any flour that is conventionally employed in the production of cookies.

Other optional ingredients, such as flavoring agents, texture-modifying agents, coloring agents, and emulsifiers, may be introduced to the flour to form a flour-containing mixture, or the optional ingredients can otherwise be mixed with the other ingredients of the extrudable final blend. When mixed with the flour prior to being blended with the flavoring agents, texture-modifying agents, and coloring agents may comprise up to about 20% by weight of the ingredients in the flour-containing mixture. Any conventional flavoring agents can be employed, such as, cocoa powder, vanilla, lemon or orange extract, cinnamon, peanut butter, butter, butter flavor, raisin flavoring, malt, molasses and other natural or artificial flavors. The texture-modifying agents which may be employed include emulsifiers and proteins for softening or hardening the finished product as well as conventional cookie ingredients such as pieces of fruit, ground nuts, oatmeal, etc. The coloring agents may be natural or artificial food colors. An emulsifier may be added to facilitate mixing of the fat or oil with the other ingredients. Any conventional emulsifier can be employed, such as lecithin and mono- and di-glycerides. Emulsifiers can be employed effectively in amounts, for example, of from about 0.05% to 0.30% of the total weight of the extrudable final blend.

Preferably, the shortening is melted and metered into the extruder where it is mixed with the other ingredients.

The plasticized crystallizable sugar, shortening, flour and optional ingredients (if present) are mixed under conditions that yield a final blend in a pumpable, extrudable state. The final blend contains about 15-35% by weight crystallizable sugar, about 15-35% by weight shortening, about 40-60% by weight flour and optional ingredients, and about 15% or less by weight moisture. Despite the fact that the final blend has such a very low moisture content, it has surprisingly been discovered that this low moisture final blend can nevertheless be extruded to form a cookie-like product having a substantially reduced need for post-extrusion processing, such as baking in heating ovens and the like, as compared to conventional cookie-making processes. The invention thus represents a significant advancement in the art.

In preferred embodiments, the ingredients are mixed to form an extrudable blend containing about 20-30% by weight crystallizable sugar, about 20-30% by weight shortening, about 45-55% by weight of a flour mixture, and about 15% or less by weight moisture. In particularly preferred embodiments, the weight ratio of crystallizable sugar to shortening to flour mixture is about 1:1:2.

One type of extruder that has been found to be suitable for practicing the invention is a twin-screw extruder. Twin screw extruders are commercially available, for example, from the Baker-Perkins Company, Grand Rapids, Mich. or Werner & Pfleiderer Corp., Ramsey, N.J.

BRIEF DESCRIPTION OF THE DRAWING

The process for producing a cookie-like product which has been discussed herein will become more evident upon reading the following description taken in conjunction with the drawing wherein the sole figure is a schematic representation of a twin-screw extruder and accessory equipment which may be employed in one embodiment of the process of the invention.

DESCRIPTION OF A PREFERRED EMBODIMENT

FOR CARRYING OUT THE INVENTION

The extruder illustrated in the drawing includes a housing 10, which houses an extruder barrel 80 containing twin extruder screws 68 and 70 that develop sufficient pressure and shear forces to plasticize the crystallizable sugar and maintain the ingredients in a pumpable, extrudable state during mixing and extrusion. The screws 68 and 70 are connected to suitable drive means not shown in the Figure, which cause them to corotate at controlled speed. The extruder barrel 80 is generally divided into a sugar feed region 12 where sugar, e.g., sucrose, is introduced into the extruder barrel, a work region 14 where shear and pressure forces are applied to the sugar to work it into a plasticized state, a blending region 16 where all of the ingredients are mixed into the extrudable final blend, and a metering extrusion region 18 for controlled extrusion of the final blend through one or more die openings 30.

In operation, a sugar feed port 22 in the extruder housing 10 provides an inlet for the passage of crystallized sugar into the sugar feed region 12 of barrel 80. A sugar feed means, indicated generally at 42, comprises a sugar feed hopper 56 having co-rotating twin-feed screws 44 disposed horizontally in the bottom thereof and extending through an opening in the front wall 46 of the hopper 56 to a point directly above the sugar port 22 for introducing sugar therein.

It is desired that the final blend of all ingredients have a moisture content of about 14% by weight or less. The principal ingredients alone may contain up to 14% by weight inherent aqueous moisture.

It may be desirable to add from about 3–5% by weight additional water. In the embodiment shown in the drawing, additional water may be added through a feed tube 34, which conveys water through fitting 40 and thence through the apparatus housing 10 at the point of transition from the sugar feed region 12 to the work region 14.

As noted above, when the crystallizable sugar passes into the work region 14, mechanical forces work the crystallizable sugar into a plasticized state. Although the shear and pressure forces applied to the crystallizable sugar material in work region 14 generate a considerable amount of heat, generally, it is necessary to apply external heat in order to maintain the fluidity and plasticity of the crystallizable sugar material. In preferred embodiments, the crystallizable sugar material is raised to a temperature within the range of about 90–135° C. in the work region 14.

The plasticized crystallizable sugar material passing into the blending region 16 of extruder barrel 80 from the work region 14 thereof, is blended with the other ingredients in blending region 16, to form a final blend.

A feed port 24 in the extruder housing 10 provides an inlet for the passage of flour and optional ingredients into the blending region 16 of barrel 80.

A flour feeding means, indicated generally at 48, is provided for feeding flour and any optional ingredients mixed therewith, to the extruder. Feeding means 48 comprises a hopper 54 having co-rotating twin feed screws 52 disposed horizontally in the bottom thereof, and extending through an opening in the front wall 50 of the hopper 54 to a point directly above a feed guide 72. The feed guide 72 has inwardly sloping walls 74 capable of conveying the flour-containing material by gravity through an opening 76 into a feed inlet tube 26 which communicates with feed port 24.

A feed tube 32 conveys shortening through fitting 36 into the feed inlet tube 26 and thence into the blending region 16 of the extruder. It is generally desirable to prevent water vapor accumulation in the feed inlet tube 26, as described in commonly owned U.S. Patent Application Ser. No. 249,344, filed Sept. 23, 1988, entitled "Steam Venting Extruded Feeder."

A major source of heat in blending region 16 is the plasticized crystallizable sugar being introduced therein from work region 14. Accordingly, the screw portions present in blending region 16 are mixing screw portions rather than work screw portions, as little or no additional work energy is needed to heat the blend and maintain it at about 90–135° C.

The final blend passes from the blending region 16 into the metering region 18 of the extruder, which terminates in a die plate 28 having one or more die openings 30, two of which are shown. In the metering region 18, the temperature of the final blend continues to be maintained at about 90–135° C., and little additional work is performed there on the final blend, thereby avoiding a substantial heat increase of the blend. The metering region 18 provides controlled extrusion of the final blend through the die openings, which can be of any desired shape.

While the use of a twin screw extruder has been found to be a convenient preferred apparatus for practicing the method of the invention, alternative extruders, or combinations of extruders, can be used and fall within the scope of the present invention. In one alternative embodiment employing two extruders, the crystallizable sugar material is worked into a plasticized state in a first extruder and is then introduced into a second extruder, where the plasticized crystallizable sugar material is blended with the flour-containing mixture and shortening. The resulting final blend is extruded from the second extruder to yield a cookie-like product.

In yet another embodiment, shortening may be mixed with flour and optional ingredients in a first extruder, and the crystallizable sugar material plasticized in a second extruder. The mixture of flour and shortening is passed from the first extruder into the second extruder, wherein all the ingredients are blended together. The resulting final blend then is extruded from the second extruder to yield a product that will exhibit cookie-like characteristics.

Regardless of the extruder system, utilized, the final blend is extruded in a long ribbon which rapidly cools to a set shape and is sectioned into cookie-like products. The extruded product has a moisture content of about 15% by weight or less. In preferred embodiments, the moisture content of the extruded blend is less than about 12% by weight, and most preferably is below about 8% by weight.

When extruded at low moisture levels, little or no additional drying is required to lower the moisture level of the extruded blend so that the finished product has a friable, short, crumb texture typical of cookies. Any residual moisture in the extruded blend can be driven off by a short drying step, such as in conventional ovens, by microwave heating or by dielectric drying as described in commonly owned U.S. Patent Application Ser. No. 924,551, filed Oct. 29, 1986, entitled "Dielectric Drying of Hot Plastic Food Extrudate." Little or no additional drying of the extruded blend in accordance with the present invention contrasts with known cookie-making processes which require a considerable amount of high temperature baking in order to produce an acceptable cookie product. The present invention is therefor considerably more efficient than prior art processes, and can be carried out with considerably less capital and energy expenditures than known commercial cookie-making processes.

The finished product according to the present invention may be of any desired extrudable food shape depending on the shape of the extruder die used. If the finished product is hollow or C-shaped, the finished product may be filled with a cream or jelly filling to produce a filled cookie-like product. If desired, the extruded ribbon can be formed while still plastic by such means as rotary molding, compression molding, stamping or other suitable means to produce a desired end-product shape.

The following example is included for illustrative purposes only and is not intended to limit the scope of the invention.

EXAMPLE

Cookies were produced in a continuous process using a Model MPF-50D twin-screw extruder and accessory equipment available from Baker-Perkins, Grand Rapids, Mich., essentially as shown in the drawing. Powdered sucrose was charged to the sugar feed hopper 56. A flour-containing mixture containing 85.5% flour, 13.3% cocoa powder, 0.6% salt and 0.6% vanilla powder was charged to feed hopper 54. Water was fed through tube 34 and melted shortening was fed through tube 32.

After start up of the equipment, the extruder was adjusted to continuously extrude a mixture based on the following ingredient feed rates:

| Sucrose powder | 11.3 Kg/hr | (25 lb/hr) |
|---|---|---|
| Water | 3.2 Kg/hr | (7.1 lb/hr) |
| Melted Shortening | 10.8 Kg/hr | (23.9 lb/hr) |
| Flour mixture | 24.9 Kg/hr | (55 lb/hr) |

Extruder barrel and blend temperatures were measured as follows:

|  | Work Region | | | Blending Region | Metering Region |
|---|---|---|---|---|---|
|  | (entrance) | (middle) | (exit) |  |  |
| Barrel temp. (°C.) | 80 | 116 | 118 | 119 | 120 |
| Blend temp. (°C.) | 75.6 | 108 | 112 | * | 103 |

*not available

The material was extruded through a single C-shaped die opening. A sample of the resulting extrudate was analyzed for moisture and found to have a moisture content of 9.1%.

The flow rate of water into the extruder then was reduced to about 1.5 kg/hr (3.3 lb/hr). A sample of the resulting extrudate was analyzed for moisture and found to have a moisture content of 6.4%, which is acceptable for a commercial cookie product.

Finally, the flow rate of water was reduced to 1.2 kg/hr (2.7 lb/hr). The barrel and blend temperatures then were as follows:

|  | Work Region | | | Blending Region | Metering Region |
|---|---|---|---|---|---|
|  | (entrance) | (middle) | (exit) |  |  |
| Barrel temp. (°C.) | 92 | 112 | 119 | 116 | 118 |
| Blend temp. (°C.) | 101 | 112 | 119 | * | 113 |

*not available

A sample of this product was analyzed for moisture and found to have a moisture content of 6.1%, which is suitable for a commercial cookie product.

The present invention is capable of producing a low-moisture cookie-like product having a distinctly friable, short, crumb texture, and a flavor characteristic of commercially available cookies. Moreover, the method of the invention produces the product by extrusion, with little if any additional drying of the product required after extrusion. Thus, the method of the present invention is capable of substantially reducing the heating costs necessary in conventional methods that require long baking times to produce cookies, as well as substantially reducing the capital costs necessary to assemble and maintain elaborate pass-through ovens for the production of cookie-like products.

We claim:

1. A method of forming a food product having cookie-like characteristics, which method comprises:
   (a) plasticizing a crystallizable sugar;
   (b) blending the plasticized crystallizable sugar with shortening and flour to form an extrudable blend containing about 15% by weight moisture or less; and
   (c) extruding said blend to form a food product having cookie-like characteristics.

2. The method of claim 1 further including the step of providing said crystallizable sugar to be plasticized, which crystallizable sugar is selected from the group consisting of sucrose, glucose, and lactose.

3. The method of claim 1 further including the step of providing said crystallizable sugar to be plasticized, which crystallizable sugar is sucrose.

4. The method of claim 1 further including the step of disposing the crystallizable sugar in an aqueous solution.

5. The method of claim 1 further including the step of providing an extruder within which steps (a), (b) and (c) occur continuously.

6. The method of claim 1 further including the step of providing a twin screw extruder within which steps (a), (b) and (c) occur continuously.

7. The method of claim 1 further including the step of maintaining plasticized crystallizable sugar at a temperature of between about 90–135° C.

8. The method of claim 1 further including the step of maintaining the extrudable blend at a temperature of between about 90–135° C.

9. The method of claim 1 wherein the plasticizing, blending and extruding steps provide an extruded blend having a moisture content of about 15% by weight or less.

10. The method of claim 1 wherein the plasticizing, blending and extruding steps provide an extruded blend having a moisture content of about 12% by weight or less.

11. The method of claim 1 wherein the plasticizing, blending and extruding steps provide an extruded blend having a moisture content of about 8% by weight or less.

12. The method of claim 1 wherein the blending step provides an extrudable blend which comprises about 15–35% by weight crystallizable sugar, about 15–35% by weight shortening, and about 40–60% by weight flour.

13. The method of claim 1 wherein the blending step produces an extrudable blend which comprises about 20–30% by weight crystallizable sugar, about 20–30% by weight shortening and about 45–60% by weight flour.

14. The method of claim 1 wherein the blending step provides an extrudable blend having a ratio by weight of crystallizable sugar to shortening to flour of about 1:1:2.

15. The method of claim 1 further including the step of drying the extruded blend by baking.

16. The method of claim 1 further including the step of forming the extruded blend into predetermined shapes.

17. A method of continuously forming a food product having cookie-like characteristics, comprising:
   (a) continuously introducing a crystallizable sugar into an extruder;
   (b) continuously plasticizing the crystallizable sugar within the extruder;
   (c) continuously introducing shortening and flour into the extruder separate from the introduction of crystallizable sugar into the extruder;
   (d) continuously blending within the extruder the plasticized crystallizable sugar with the shortening and flour to form an extrudable blend containing about 15% by weight or less moisture; and
   (e) continuously extruding said blend to form a food product having cookie-like characteristics.

* * * * *

UNITED STATES PATENT AND TRADEMARK OFFICE
CERTIFICATE OF CORRECTION

PATENT NO. : 4,948,612

DATED : August 14, 1990

INVENTOR(S) : Lewis C. Keller and Richard B. Reed

It is certified that error appears in the above-identified patent and that said Letters Patent is hereby corrected as shown below:

Column 4, line 46, "corotate" should be --co-rotate--;

Column 5, line 1, no separation of paragraph from column 4, line 68;

Column 6, line 16, delete " , " after "system".

Signed and Sealed this

Twenty-first Day of April, 1992

Attest:

HARRY F. MANBECK, JR.

Attesting Officer

Commissioner of Patents and Trademarks